US012757831B2

(12) United States Patent
Suchoza

(10) Patent No.: US 12,757,831 B2
(45) Date of Patent: Oct. 13, 2026

(54) OUTDOOR POWER MACHINE WITH MIXED FLOW BLOWER

(71) Applicant: Greenworks (Jiangsu) Co., Ltd, Changzhou (CN)

(72) Inventor: Nicholas Suchoza, Mooresville, NC (US)

(73) Assignee: Greenworks (Jiangsu) Co., Ltd, Changzhou (CN)

(*) Notice: Subject to any disclaimer, the term of this patent is extended or adjusted under 35 U.S.C. 154(b) by 17 days.

(21) Appl. No.: 18/749,702

(22) Filed: Jun. 21, 2024

(65) Prior Publication Data

US 2024/0423128 A1 Dec. 26, 2024

Related U.S. Application Data

(60) Provisional application No. 63/522,521, filed on Jun. 22, 2023.

(51) Int. Cl.

*A01D 43/00* (2006.01)
*A01G 20/47* (2018.01)
*F04D 25/06* (2006.01)
*F04D 29/42* (2006.01)

(52) U.S. Cl.

CPC ............. *A01D 43/00* (2013.01); *A01G 20/47* (2018.02); *F04D 25/0673* (2013.01); *F04D 29/4206* (2013.01)

(58) Field of Classification Search

CPC .... A01D 43/00; A01G 20/47; F04D 25/0673; F04D 29/4206; F04D 19/002; F04D 25/12

See application file for complete search history.

(56) References Cited

U.S. PATENT DOCUMENTS

| | | | | |
|---|---|---|---|---|
| 12,144,293 | B1 * | 11/2024 | Kinkead | A01G 20/47 |
| 2008/0236327 | A1 * | 10/2008 | Cockerham | B60N 2/02246 74/502.6 |
| 2012/0246865 | A1 * | 10/2012 | Lauer | A01D 42/06 15/405 |
| 2015/0190021 | A1 * | 7/2015 | Barkow | E01H 1/0809 15/405 |
| 2016/0113207 | A1 * | 4/2016 | Shumaker | B08B 5/02 15/405 |
| 2019/0145657 | A1 * | 5/2019 | Pirouzpanah | F04D 17/06 126/110 R |
| 2020/0120881 | A1 * | 4/2020 | Hall | A01G 20/47 |

(Continued)

FOREIGN PATENT DOCUMENTS

JP 2011038481 A * 2/2011

OTHER PUBLICATIONS

Why Choose a Mixed Flow/Diagonal Fan for Efficiency, hydroexperts.com.au, published 2019, URL: https://www.hydroexperts.com.au/Fan-Types-Why-Choose-an-Mixed-Flow-/-Diagonal-Fan (Year: 2019).*

(Continued)

*Primary Examiner* — Thomas Fink

(57) ABSTRACT

An outdoor power machine comprises a chassis, a base plate connected to the chassis and a fan mounted to the base plate, the fan includes a housing and an impeller, the housing has an inlet end and an outlet end, the impeller is rotatably mounted in the housing, and the impeller guides airflow within the fan having both a radial velocity component and an axial velocity component.

17 Claims, 15 Drawing Sheets

(56) References Cited

U.S. PATENT DOCUMENTS

| | | | | |
|---|---|---|---|---|
| 2021/0105939 | A1* | 4/2021 | Zeiler | A01D 34/82 |
| 2021/0114673 | A1* | 4/2021 | Street | F04D 29/545 |
| 2023/0090301 | A1* | 3/2023 | Yamamoto | H02J 7/00045<br>307/9.1 |
| 2023/0389472 | A1* | 12/2023 | Yang | B60L 58/21 |

OTHER PUBLICATIONS

Youtube.com (URL: https://www.youtube.com/watch?v=Ep7U7XVdMt4) published 2021 (Year: 2021).*

FZ Billy Goat Attachment Blower for ZTR Mowers, URL: https://blog.billygoatparts.com/fz-billy-goat-attachment-blower-for-ztr-mowers/ (Year: 2014).*

* cited by examiner

OUTDOOR POWER MACHINE WITH MIXED FLOW BLOWER

CROSS REFERENCE TO RELATED APPLICATIONS

The present application claims the benefit of U.S. Provisional Patent Application No. 63/522,521 filed on Jun. 22, 2023, the contents of which are incorporated herein by reference in their entirety.

BACKGROUND OF THE INVENTION

This invention relates generally to outdoor power equipment, and more particularly to self-propelled outdoor power machines.

BACKGROUND

Various types of outdoor power machines are known. Examples of common machines include electric utility vehicles, lawn mowers, and lawn tractors. Some outdoor power machines have an operator seat and are considered "ride-on", "riders", or "riding" machines. Others accommodate an operator in a standing position, described as a "stand-on" or "stander" machine.

Some known outdoor power machines are battery powered. They include a battery pack which provides electric power for the primary operating components of the machine, such as the drive wheels and mower deck or other powered implements. The battery pack also provides electric power for controls, displays, and accessories of the machine.

Some accessories for outdoor power machines require mechanical power for operation. It is known in outdoor power machines having internal combustion engines to power such accessories using a mechanical power take off (PTO) such as a shaft or pulley mechanically coupled to the machine's prime mover.

There remains a need for electric-powered outdoor power machines having powered accessories, in particular an electric-powered blower having good efficiency in a compact design.

BRIEF SUMMARY OF THE INVENTION

This need is addressed by an outdoor power machine including a mixed flow blower.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
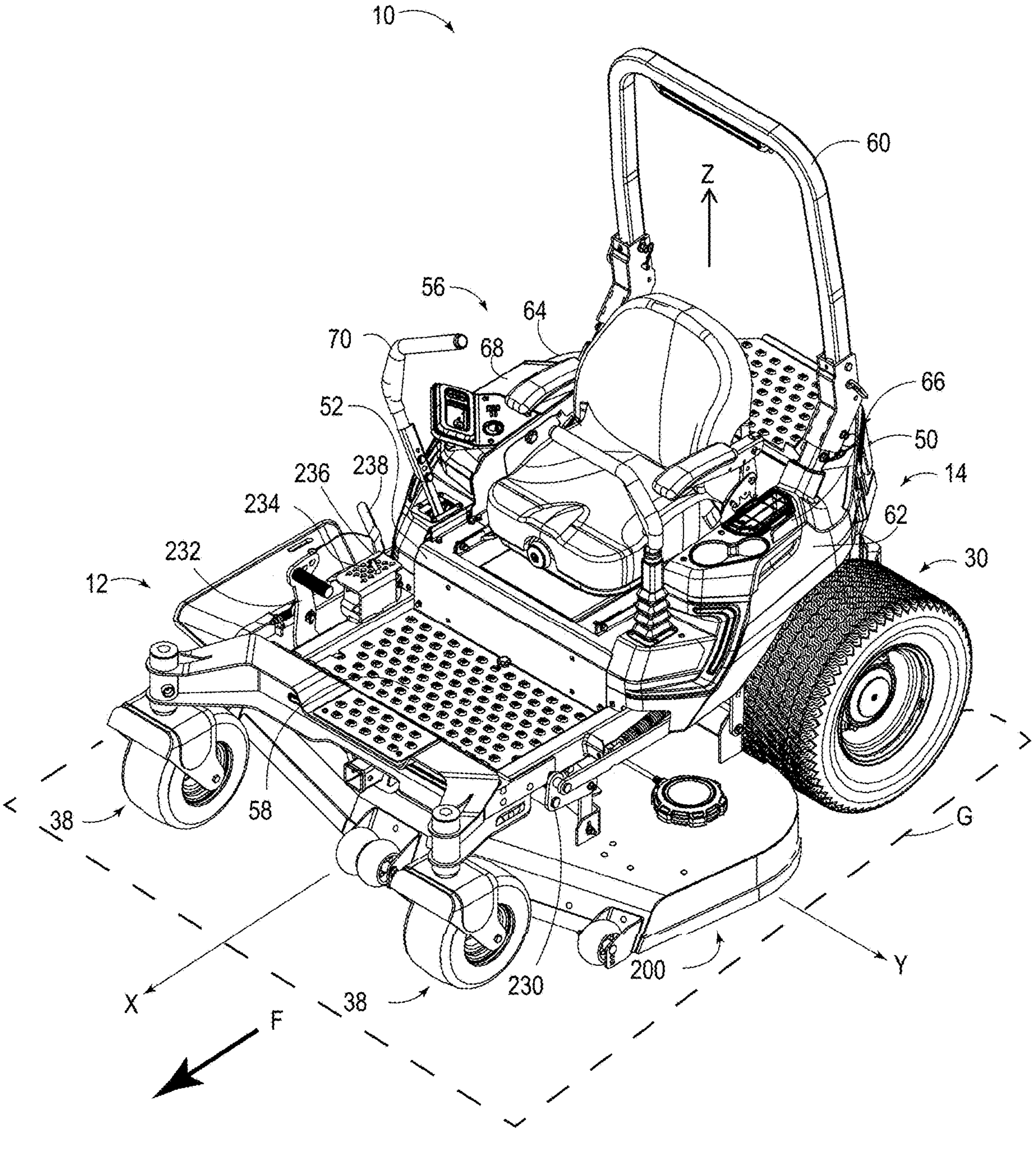
FIG. 1 is a front perspective view of an exemplary ride-on zero-turn outdoor power machine.
Figure 2:
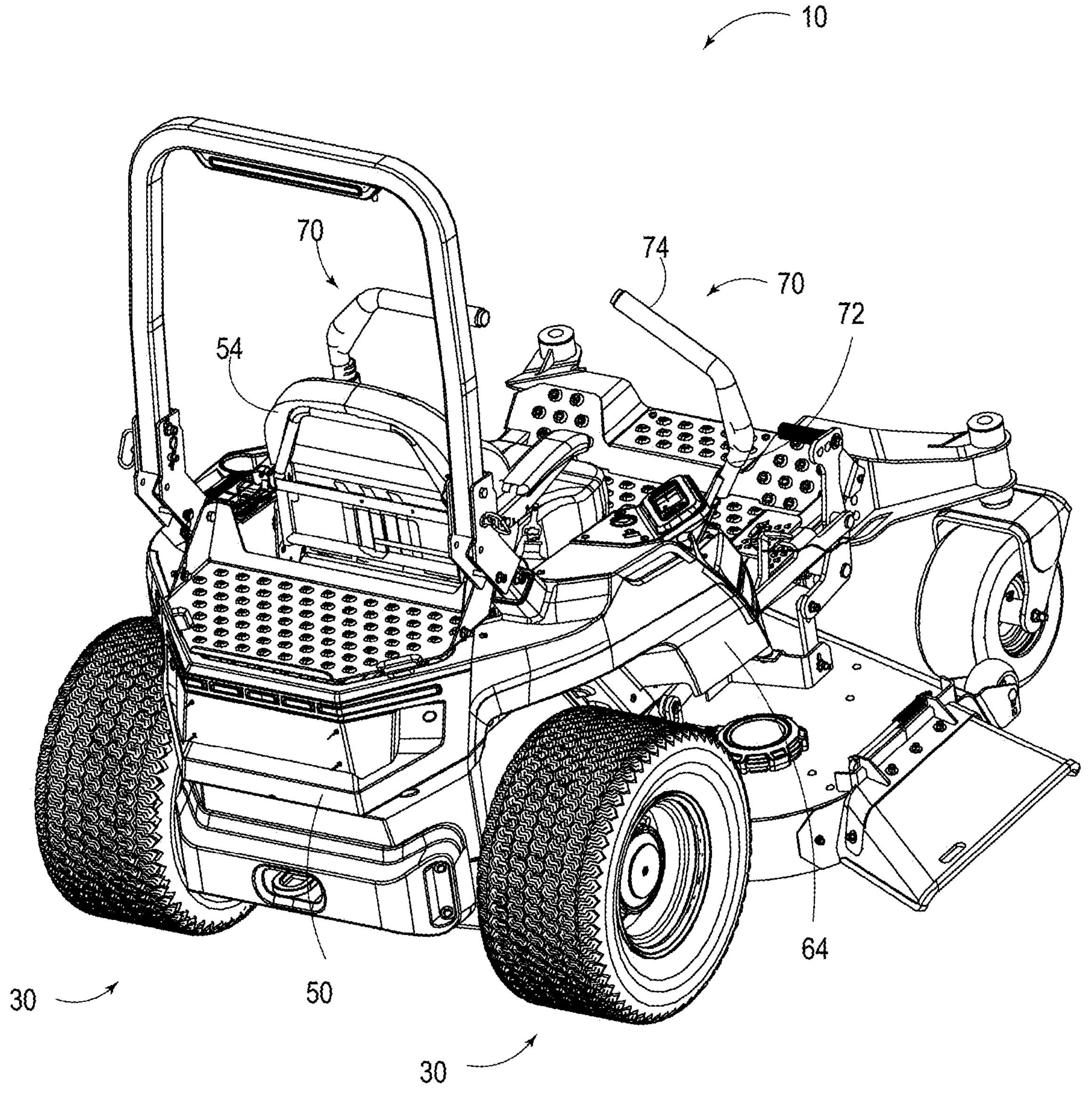
FIG. 2 is a rear perspective view of the machine of FIG. 1.
Figure 3:
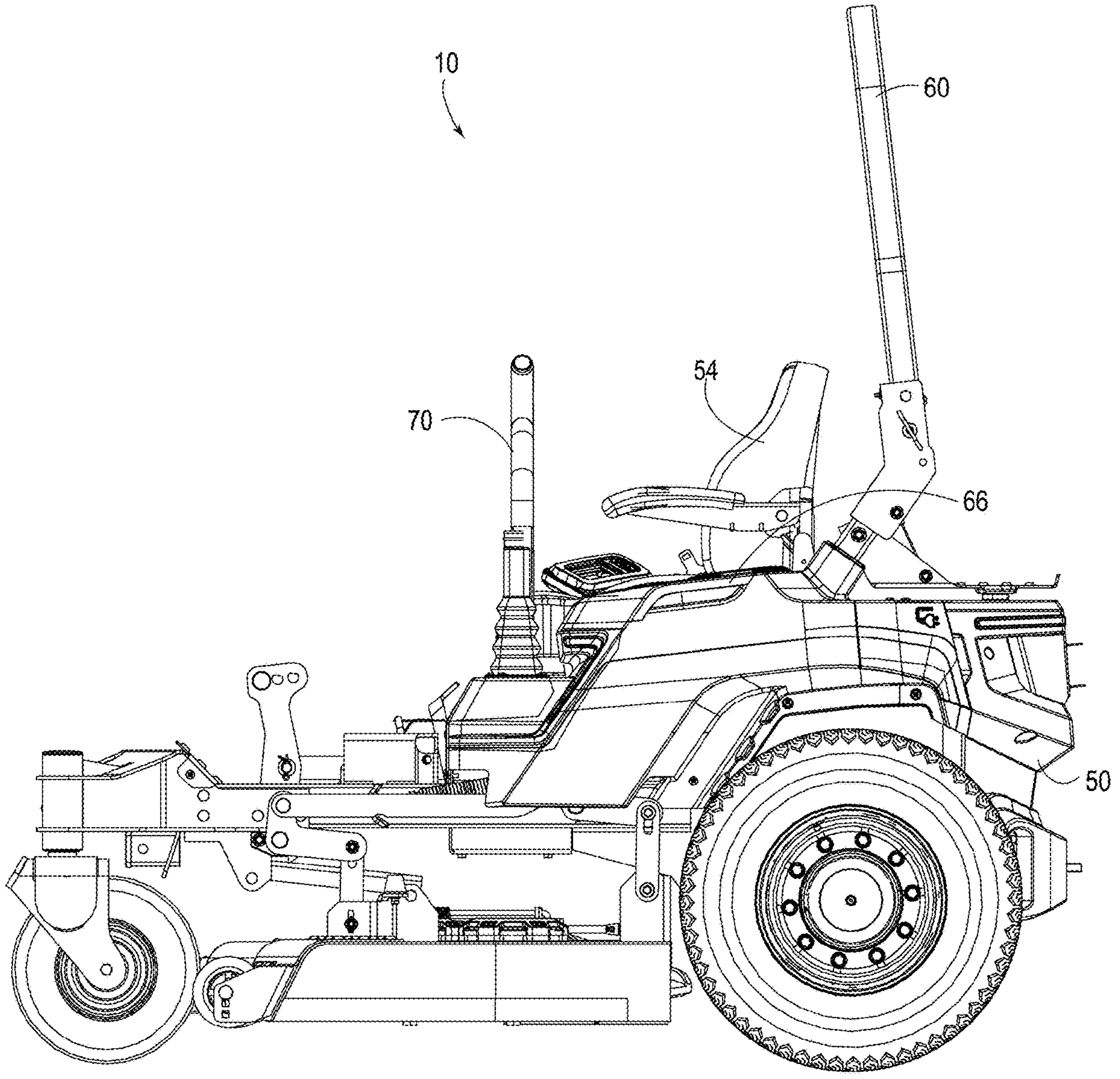
FIG. 3 is a side elevation view of the machine of FIG. 1.
Figure 4:
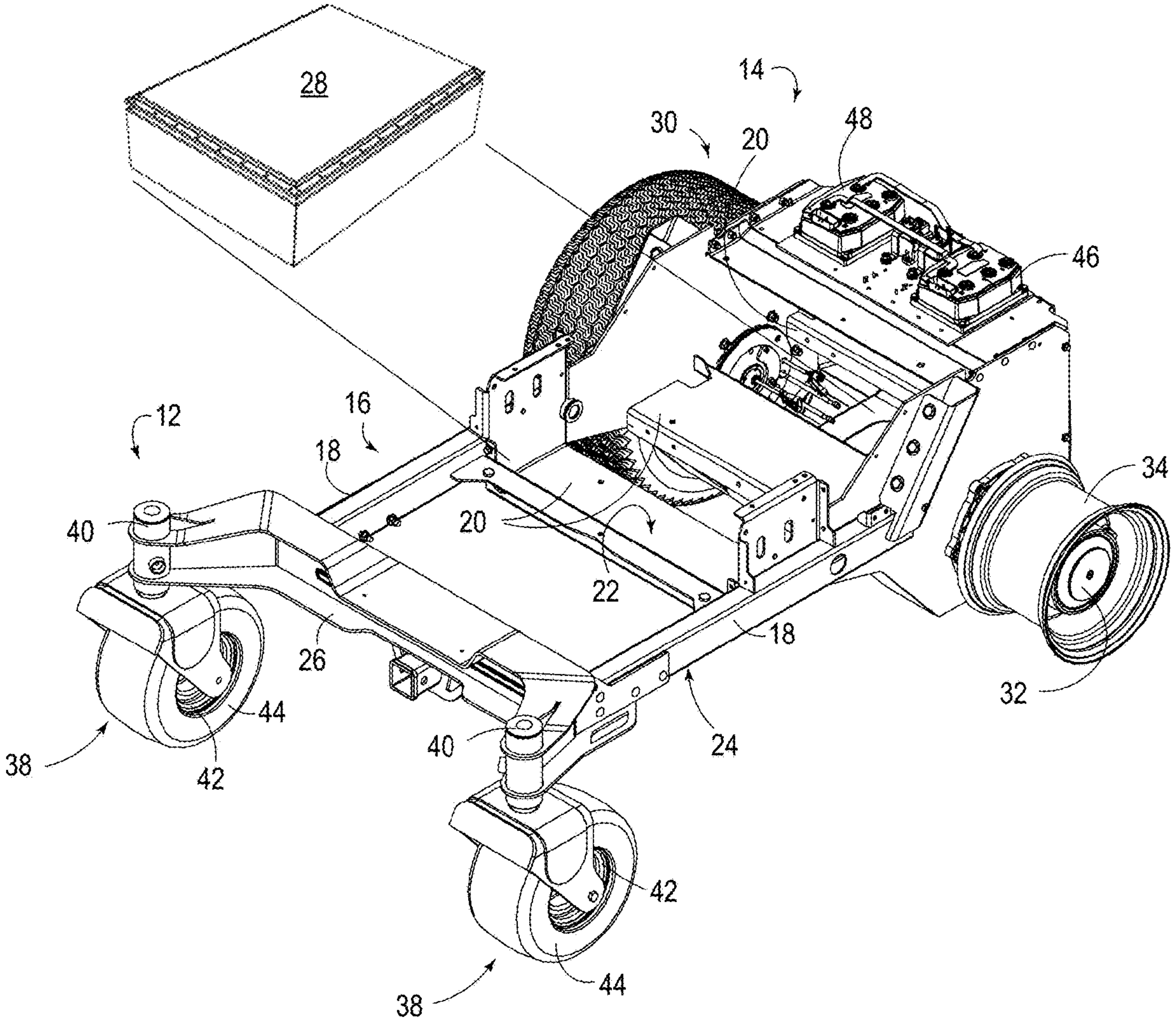
FIG. 4 is a perspective view of a chassis of the machine of FIG. 1.
Figure 5:
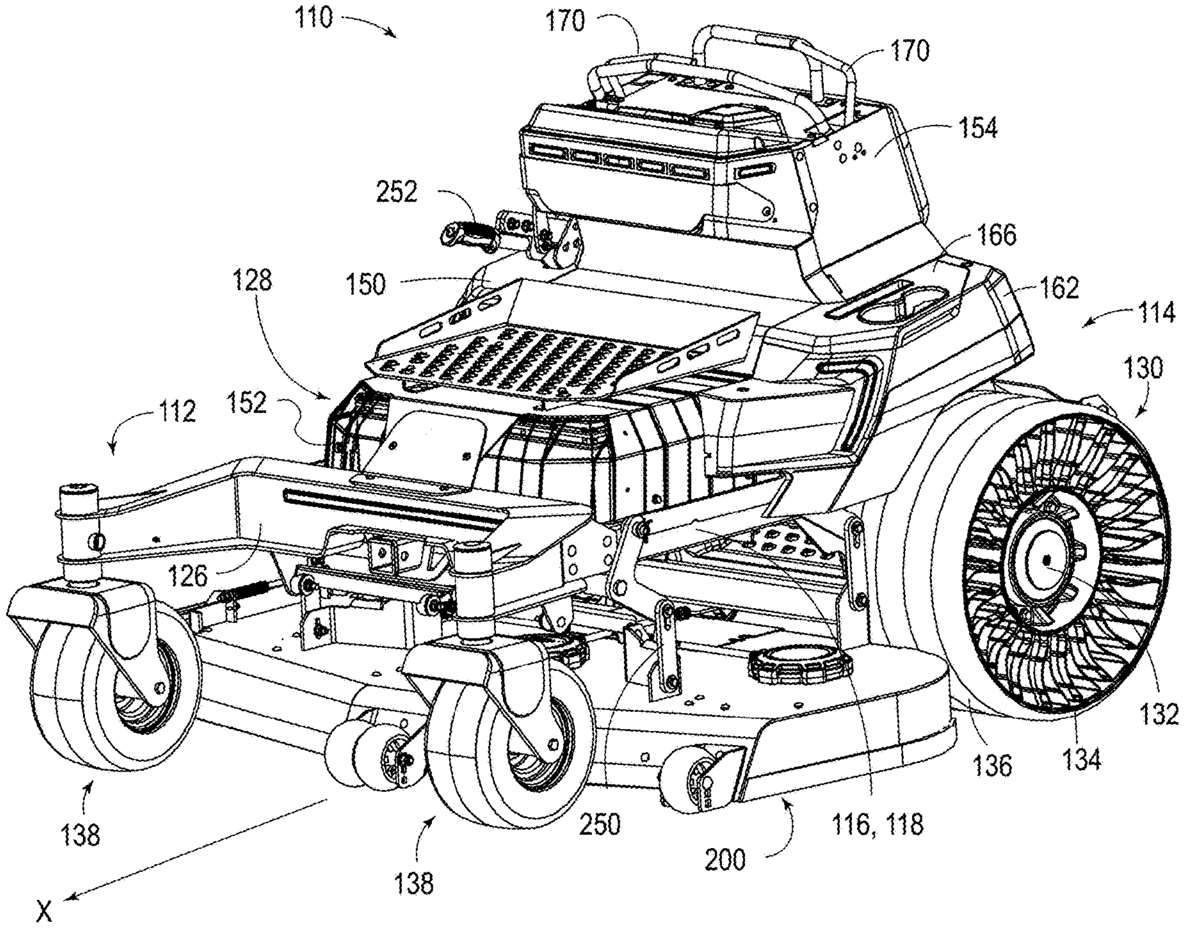
FIG. 5 is a front perspective view of an exemplary stand-on zero-turn outdoor power machine.
Figure 6:
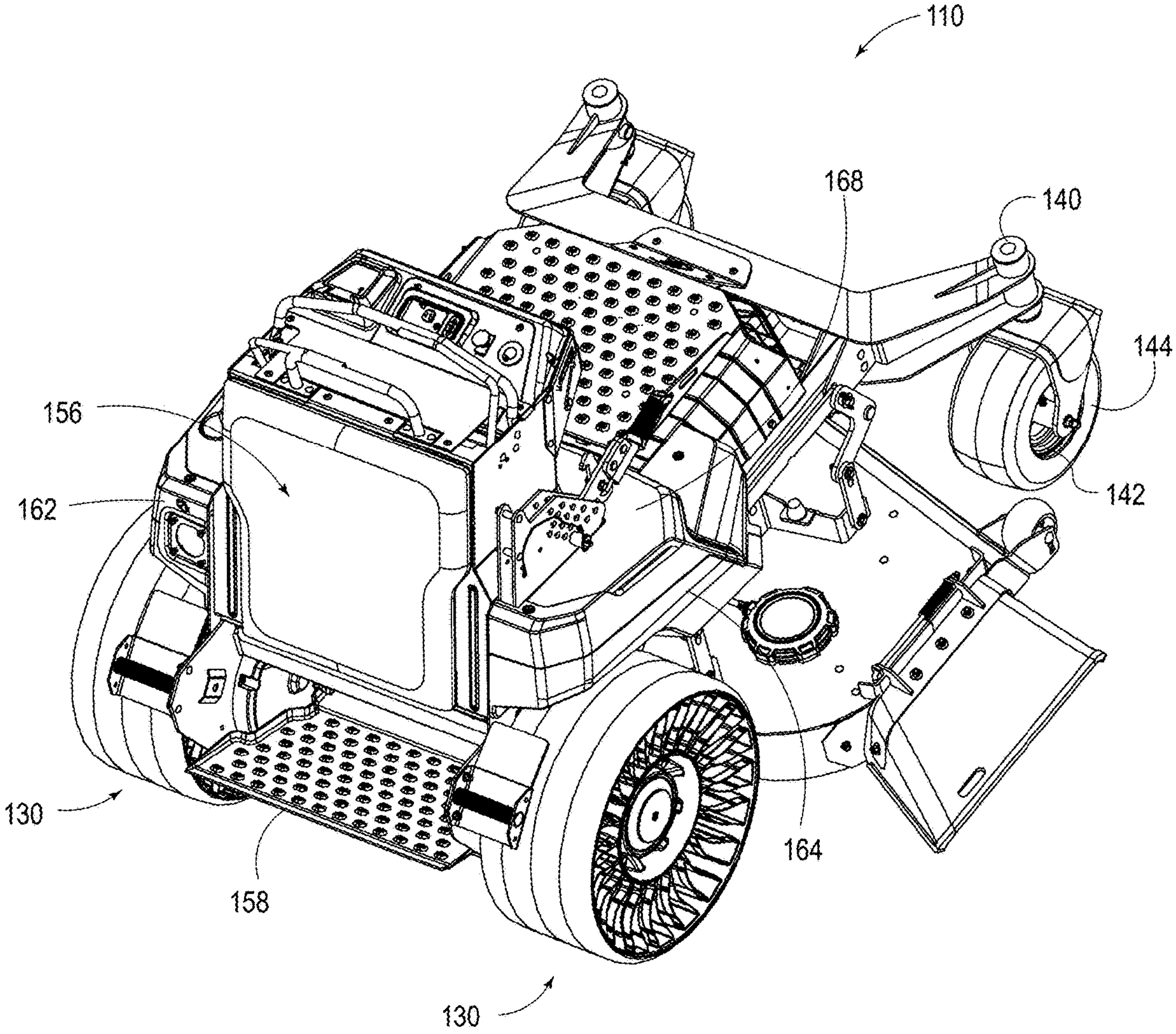
FIG. 6 is a rear perspective view of the machine of FIG. 5.
Figure 7:
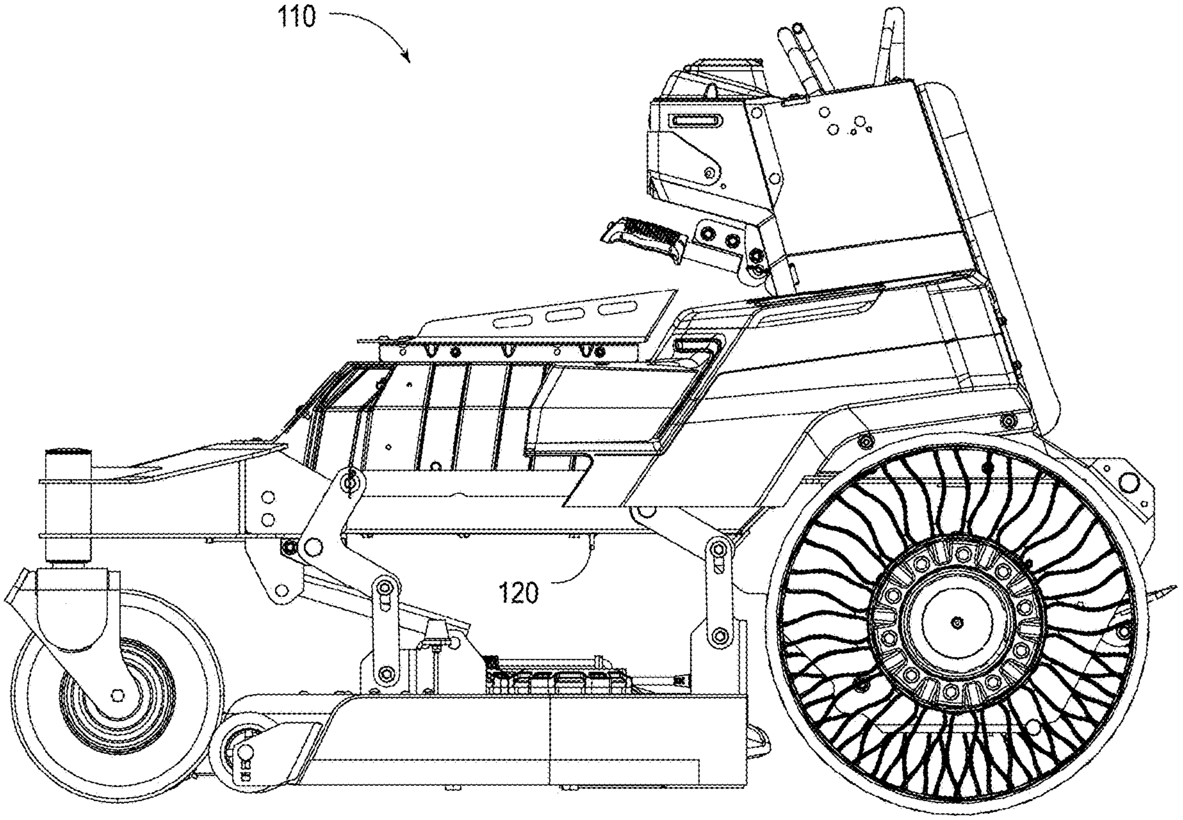
FIG. 7 is a side elevation view of the machine of FIG. 5.
Figure 8:
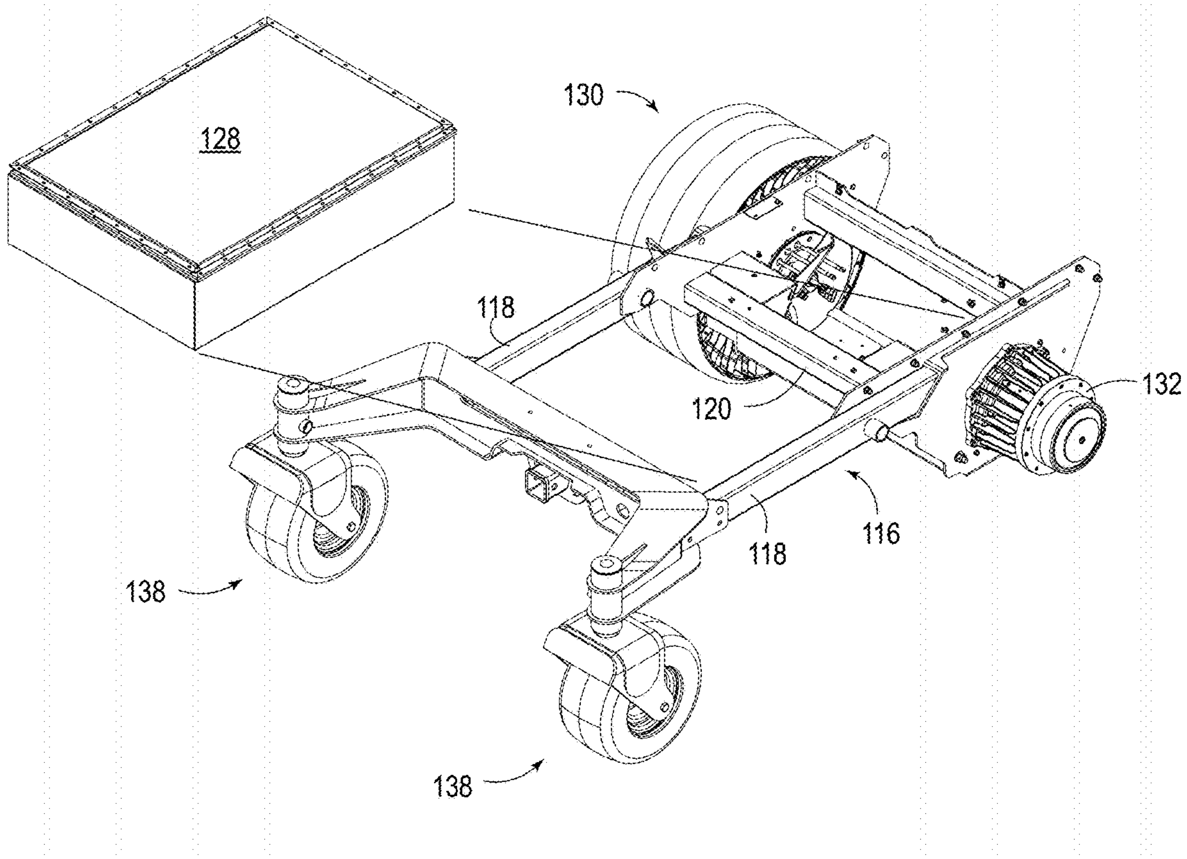
FIG. 8 is a perspective view of a chassis of the machine of FIG. 5.

Referring to the drawings wherein identical reference numerals denote the same elements throughout the various views, FIGS. 1-4 show a representative embodiment of an outdoor power machine 10. The machine 10 extends along an axial direction (arrow "X") between a front end 12 and a rear end 14. The points of contact of the wheels of the machine 10 collectively define a ground plane "G".

It is noted that, as used herein, the terms "axial" and "longitudinal" both refer to a direction parallel to the axis X, while "vertical" refers to a direction perpendicular to the axial direction and to the ground plane G (see arrow "Z" in FIG. 1) and "lateral" refers to a direction mutually perpendicular to the axial and vertical directions (see arrow "Y" in FIG. 1). A primary forward direction of ground travel is shown by the arrow "F" in FIG. 1. These directional terms are used merely for convenience in description and do not require a particular orientation of the structures described thereby.

In the illustrated example, the outdoor power machine 10 is a zero-turn-radius type machine, alternatively referred to as a "zero-turn" machine. This type of machine is capable of changing its direction of travel (heading) without significant forward or backward movement. This is accomplished by differential rotation of drive wheels on opposite sides of the machine 10 to produce a yawing motion. For example, rotating the right-side wheel forward and simultaneously rotating the left-side wheel backward at the same wheel speed (RPM) will cause the machine 10 to yaw (turn) to the left without moving forwards or backwards. Related steering effects may be obtained by rotating drive wheels on opposite sides in different directions and different wheel speeds, by holding one wheel stationary while driving the opposite-side wheel in a chosen direction, or by rotating the wheels on opposite sides in the same direction at different wheel speeds.

The principles described herein are also applicable to a non zero-turn mower (not shown) using a conventional steering linkage to pivot (steer) some or all of the wheels.

In the example shown in FIGS. 1-4, the machine 10 is a ride-on machine (alternatively referred to as a "rider" or "riding machine").

The machine 10 has a chassis 16 (FIG. 4) which provides structural support as well as mounting locations for the various components of the machine 10. Any material with adequate structural strength may be used to construct the chassis 16. Examples of suitable materials include metals such as aluminum and steel and their alloys. The chassis 16 may be monolithic or may be built up from smaller components, e.g., via fasteners, adhesives, or welding.

The chassis 16 includes a pair of spaced-apart main frame rails 18 extending in a longitudinal direction from the front end 12 of the machine 10 to the rear end 14 of the machine 10. Cross-members 20 interconnect the main frame rails 18. Top surfaces 22 of the cross-members 20 are positioned even with or lower than the bottom surfaces 24 of the main frame rails 18.

A front axle assembly 26 interconnects the main frame rails 18 at the front end 12 of the machine 10.

The machine 10 is equipped with an electric power pack 28 suitable for storing and discharging electric energy. In the illustrated example, the electric power pack 28 is a storage battery including one or more chemical cells, for example lithium ion cells. Other liquid battery chemistries may be substituted, as well as solid state batteries, capacitors, or similar devices which may exist currently or be later developed. The electric power pack 28 may include ancillary electric components such as inverters, transformers, voltage converters, relays, circuit breakers, and/or sensors. In the illustrated example, the electric power pack 28 includes at least one set of terminals providing a high voltage output (e.g. 82 V) for operating the primary components of the machine 10, such as the drive wheels and mower deck or other powered implement. It also includes another set of terminals providing a low voltage output (e.g. 12 V) for operating the control systems of the machine 10 as well as certain accessories.

The electric power pack 28 is positioned on the cross-members 20 and may be secured by fasteners, clips, latches, or the like (not shown).

The electric power pack 28 is positioned such that some portion of it is located at or below the bottom surfaces 24 of the main frame rails 18. Stated another way, the electric power pack 28 is positioned "between" the main frame rails 18, rather than sitting above or on top of the main frame rails 18. In the illustrated example, the bottom surface of the electric power pack 28 is located below the bottom surface of the main frame rails 18.

The machine 10 is equipped with a drive wheel assembly 30, one on each side. Each drive wheel assembly 30 includes an integral drive hub 32 containing an internal electric motor, gear reduction drive, an optional brake (not separately illustrated), a drive wheel 34, and a tire 36 mounted to the drive wheel 34. It is noted that wheels having a ground-engaging surface, and thus not requiring a separate tire, are known in the art. The integral drive hub 32 is physically mounted to the chassis 16 such that the drive wheel 34 can rotate relative to the chassis 16. As will be described in further detail, the machine 10 is configured such that the wheel speed and direction of rotation can be controlled independently for the left- and right-side drive wheel assemblies 30. In the illustrated example, the drive wheel assemblies 30 are located at or near the rear end 14 of the machine 10. Alternatively, the drive wheel assemblies 30 could be located at or near the front end 12 of the machine 10.

The machine 10 is equipped with left- and right-side steer wheel assemblies 38. Each steer wheel assembly 38 includes a pivot assembly 40, a steer wheel 42, and a tire 44 mounted to the steer wheel 42. It is noted that wheels having a ground-engaging surface, and thus not requiring a separate tire, are known in the art. Each steer wheel assembly 38 is mounted to the chassis 16 such that the steer wheel 42 can rotate relative to the chassis 16 as well as pivot freely about an upright (vertical or near-vertical) axis. The steer wheel assemblies 38 function as casters and therefore passively steer the machine 10. As noted above, the principles described herein are also applicable to a non zero-turn mower (not shown) using a conventional steering linkage to pivot (i.e., actively steer) some or all of the wheels.

The machine 10 is equipped with suitable electric connections, controls, and switching equipment to permit the operator to control the drive functions of the machine 10. In the illustrated example, the machine 10 includes a left drive motor controller 46 and a right drive motor controller 48. Each of these drive motor controllers 46, 48 includes an electric power connection to the electric power pack 28 as well as connections to operator controls as described below. Each drive motor controller 46, 48 is operable to receive a command signal from an operator control and to provide electric power to drive its associated drive wheel assembly 30 at the commanded wheel speed and direction.

The machine 10 includes a body 50 or superstructure positioned above the chassis 16. The body 50 functions to enclose the operating components of the machine 10, to provide the mounting structure for controls and accessories of the machine 10, and to provide a desired external appearance.

The body 50 includes a battery cover assembly 52 which encloses the electric power pack 28.

An operator seat 54 is mounted on top of the battery cover assembly 52. The operator seat 54 may be adjustable in one or more directions, may include retractable armrests, and may include a seatbelt or other restraint for the operator. The battery cover assembly 52 and the operator seat 54 collectively define an "operator station" 56 which functions to support the operator in a position with access to machine controls during operation.

A foot deck 58 is mounted to the chassis 16 forward of the battery cover assembly 52. This serves as a support for the operator's feet. As illustrated, it may be provided with a raised tread structure to increase traction and avoid slippage.

A rollover protection system ("ROPS") 60 is mounted to the body 50 just aft of the operator seat 54. This is a hoop-like structure or rollbar which extends above the operator's head in the seated position. This functions to prevent injury to the operator should the machine 10 rollover in operation. In the illustrated example, the rollover protection system 60 can be folded down or removed to permit operations under low-hanging structures or vegetation, or to make the machine 10 more compact for transportation.

The body 50 includes left and right fenders 62, 64 respectively which flank the left and right sides of the operator seat 54. The left fender 62 is topped by a left console 66 and the right fender 64 is topped by a right console 68.

The body 50 carries one or more operator controls within reach of the operator seat 54. The primary operator controls include a pair of steering levers 70, one for the left side and one for the right side. Each steering lever 70 is generally L-shaped and includes a vertical section 72 pivotally mounted to the body 50 near the forward edge of the operator seat 54, and a horizontal section 74 which extends from the top of the vertical section 72 towards the centerline X of the machine 10.

Each steering lever 70 is pivotally mounted such that it can move in a fore-aft direction to control drive wheel speed. More specifically, the steering lever 70 is spring-loaded to a neutral position which commands drive wheel speed to stop and/or apply a brake. Movement in the forward direction away from the neutral position commands forward wheel rotation, with RPM proportional to steering lever deflection. Movement in the rearward direction away from the neutral position commands reverse wheel rotation, with RPM proportional to steering lever deflection.

Each steering lever 70 is further pivotally mounted so that it can move in a lateral direction between an outboard parking position and an inboard use position.

Optionally, the machine 10 may be equipped with parking switches (not illustrated) which are operable to detect if the steering levers 70 are in the outboard position or the inboard position. The parking switches may be configured such that the machine drive wheel assemblies 30 cannot be operated unless both steering levers 70 are pivoted to the inboard position.

Further controls are not separately illustrated but can include one or more of the following: a key switch or other security device; a main power switch; an emergency stop control; a blade start/stop switch; a blade speed control; a drive speed limiter or cruise control; and lighting controls. These further controls may be mounted, for example to the left or right consoles 66, 68.

The outdoor power machine 10 may be used as follows. First, the operator sits in the operator seat 54 and activates the key switch or main power switch. A blade start/stop switch or other switch is used to turn on mowing blades or other powered implement, and the implement is adjusted to an operating position, such as a desired cutting height for mowing. The steering levers 70 are moved from the outboard parking position to the inboard use position. The operator then uses the steering levers 70 to drive the outdoor power machine 10 in the desired direction while mowing or other implement operation takes place. It will be understood from the above description that manipulation of the steering levers 70 is sufficient to control forward and aft movement of the outdoor power machine 10, as well as braking and steering.

FIGS. 5-8 illustrate another exemplary embodiment of an outdoor power machine 110. This embodiment of the machine 110 is a stand-on machine (alternatively referred to as a "stander"). The overall construction of the machine 110 is similar to the machine described above. Elements of the machine 110 not explicitly described may be taken to be identical to the machine 110 described above.

The machine 110 has a chassis 116 including main frame rails 118 extending in a longitudinal direction from a front end 112 of the machine 110 to a rear end 114 of the machine 110. Cross-members 120 interconnect the main frame rails 118. A front axle assembly 126 interconnects the main frame rails 118 at the front end 112 of the machine 110.

The machine 110 is equipped with an electric power pack 128 as described above.

The machine is equipped with left- and right-side drive wheel assemblies 130. Each drive wheel assembly 130 includes an integral drive hub 132 containing an electric motor, a gear reduction drive, and an optional brake (not separately illustrated), a drive wheel 134, and a tire 136 mounted to the drive wheel 134. It is noted that wheels having a ground-engaging surface, and thus not requiring a separate tire, are known in the art. In the illustrated example, the drive wheel assemblies 130 are located at or near the rear end 114 of the machine 110. Alternatively, the drive wheel assemblies 130 could be located at or near the front end 112 of the machine 110.

The machine 110 is equipped with left- and right-side steer wheel assemblies 138. Each steer wheel assembly 138 includes a pivot assembly 140, a steer wheel 142, and a tire 144 mounted to the steer wheel 142. It is noted that wheels having a ground-engaging surface, and thus not requiring a separate tire, are known in the art. Each steer wheel assembly 138 is mounted to the chassis 116 such that the steer wheel 142 can rotate relative to the chassis 116 as well as pivot freely about an upright (vertical or near-vertical) axis. The steer wheel assemblies 138 function as casters and therefore passively steer the machine 110. As noted above, the principles described herein are also applicable to a non zero-turn mower (not shown) using a conventional steering linkage to pivot (i.e., actively steer) some or all of the wheels.

The machine 110 is equipped with suitable electric connections, controls, and switching equipment to permit the operator to control the drive functions of the machine 110. In the illustrated example, the machine 110 includes a left drive motor controller 146 and a right drive motor controller 148. Each of these drive motor controllers 146, 148 includes an electric power connection to the electric power pack 128 as well as connections to operator controls as described below. Each drive motor controller is operable to receive a command signal from an operator control and to provide electric power to drive its associated drive wheel assembly 130 at the commanded wheel speed and direction.

The machine 110 includes a body 150 or superstructure positioned above the chassis 116.

The body 150 includes a battery cover assembly 152 which encloses the electric power pack 128. A control pedestal 154 is mounted on top of the battery cover assembly 152.

A foot deck 158 is mounted to the chassis 116 aft of the battery cover assembly 152. This serves as a support for the operator's feet. As illustrated, it may be provided with a raised tread structure to increase traction and avoid slippage. The battery cover assembly 152, the control pedestal 154, and the foot deck 158 collectively define an "operator station" 156 which functions to support the operator to provide access to machine controls during operation.

The body 150 includes left and right fenders 162, 164 respectively which flank the left and right sides of the control pedestal 154. The left fender 162 is topped by a left console 166 and the right fender 164 is topped by a right console 168.

The body 150 carries one or more operator controls within reach of the operator station 156. The primary operator controls include a pair of steering levers 170, one for the left side and one for the right side. Each steering lever 170 is generally L-shaped and includes a vertical section 172 pivotally mounted to the control pedestal 154, and a horizontal section 174 which extends from the top of the vertical section 172 towards the centerline X of the machine 110. Each steering lever 170 is pivotally mounted such that it can move in a fore-aft direction to control drive wheel speed as described above.

Each steering lever 170 is further pivotally mounted so that it can move in a lateral direction between an outboard parking position and an inboard use position. Optionally, the machine 110 may be equipped with parking switches as described above.

Further controls are not separately illustrated but can include one or more of the following: a key switch or other security device; a main power switch; an emergency stop control; a blade start/stop switch; a blade speed control; a drive speed limiter or cruise control; and lighting controls. These further controls may be mounted, for example to the control pedestal 154 or to the left or right consoles 166, 168.

Any of the outdoor power machines described herein may be may be equipped with one or more implements, defined generally as a device attached to or carried by the machine and operable to cut, shape, load, lift, move, transport material, or perform an operating function. Nonlimiting examples of implements include mowing decks, plows, disks, scarifiers, rippers, aerators, dethatchers, blades, buckets, scrapers, blowers, pressure washers, surface cleaners, inverter/generators, or battery chargers.

Figure 9:
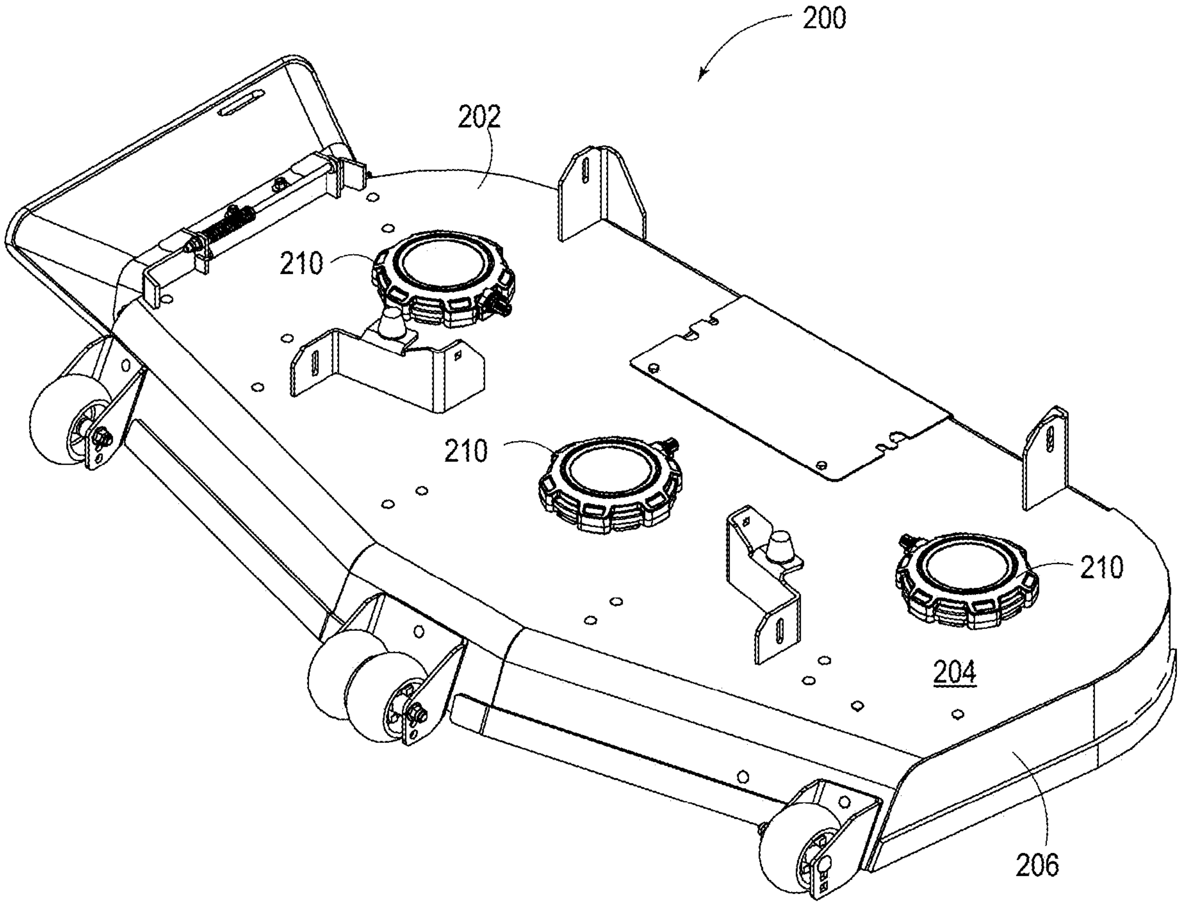
FIG. 9 is a perspective view of an exemplary mowing deck.
Figure 10:
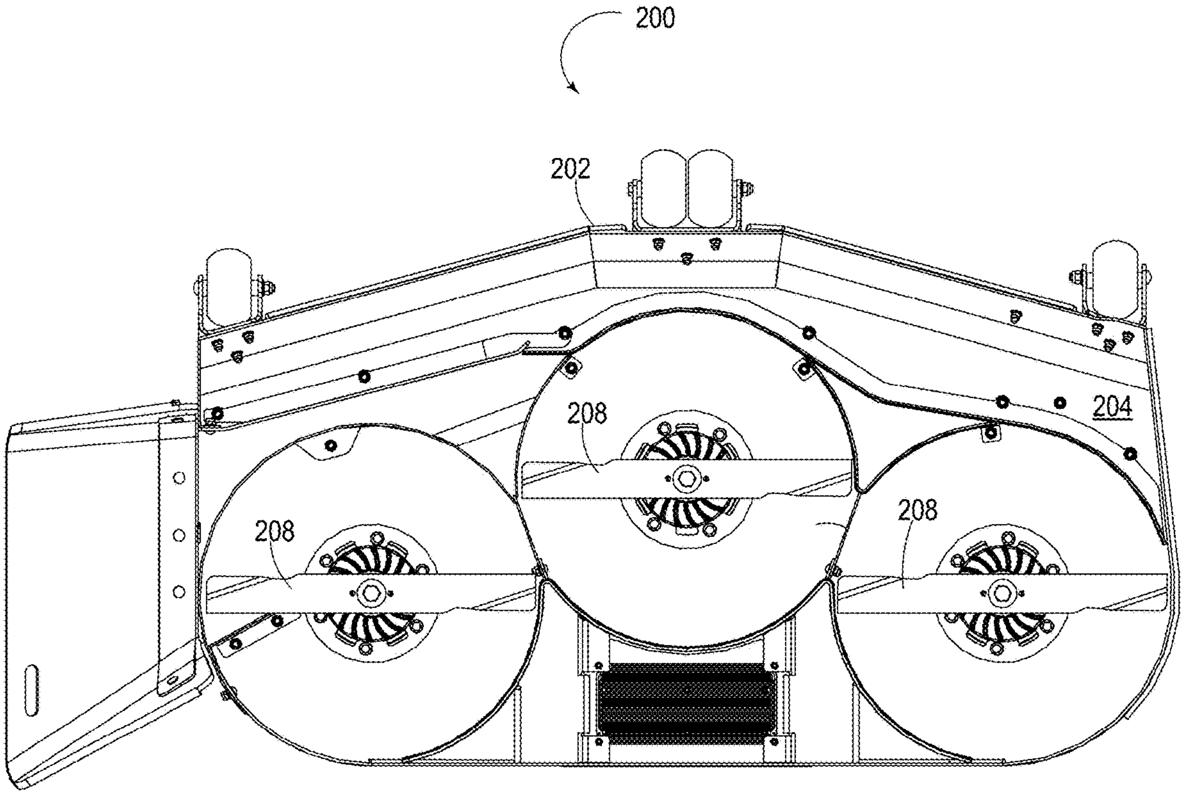
FIG. 10 is a bottom plan view of the mowing deck of FIG. 9.

In the illustrated example, the machine 10 or 110 is equipped with a mowing deck assembly 200 (FIGS. 9, 10). It includes a deck 202 which is an open-bottomed enclosure including a top panel 204 and a peripheral wall 206.

The deck 202 has a nominal designated width which may be selected to provide a desired cutting swath. Non-limiting examples of suitable deck widths include 48 inches, 52 inches, 60 inches, or 72 inches.

One or more mowing blades 208 are rotatably mounted on the underside of the top panel 204. The mowing blades 208 are positioned in a side-by side configuration such that their tips will not collide in operation. The mowing blades 208 may be positioned to have some overlap in at least one dimension so as to prevent un-mowed strips during mower operation. The dimensions of the individual mowing blades 208 are selected to provide adequate structural strength at selected operating speed, (e.g. 3600 RPM). Generally, the size of the individual mowing blades 208 is equal to the deck width divided by the number of mowing blades 208, with some additional diameter provided to accommodate for swath overlap. For example, a deck 202 having a nominal width of 60 inches may use three mowing blades 208 each having a diameter of 20.5 inches.

Means are provided for driving the mowing blades 208. Nonlimiting examples of suitable drive methods include mechanical, hydraulic, or electric devices. In the illustrated example, each mowing blade 208 is directly driven by its own individual electric blade motor 210.

The mowing deck assembly 200 is connected to the chassis via a deck lift. The deck lift is operable to position the mowing blades 208 at a preselected distance above the ground plane G of the machine. Typical examples include a cutting height in the range of approximately 1 inch to approximately 6 inches. The deck lift is also operable to lift the mowing deck assembly 200 well above any intended cutting height so that the machine can traverse obstacles, travel along a road to a worksite, or be loaded or unloaded from a trailer or storage building. This is referred to as a "travel position".

In the example shown in FIGS. 1-4, a deck lift 230 includes a foot pedal 232 to raise the deck lift 230. A removable pin 234 is insertable into a selected hole in a blade height adjuster 236. The position of the pin 234 determines a cutting height by blocking the deck lift 230 at a specific position. An uplock lever 238 is provided to selectively lock and release the deck lift 230 in the travel position.

In the example shown in FIGS. 5-8, the mowing deck assembly 200 is connected to the chassis 116 via a deck lift 250. The deck lift 250 is similar to the deck lift 230 described above, the primary difference being that is operated by a hand lever 252 as opposed to a pedal.

Figure 11:
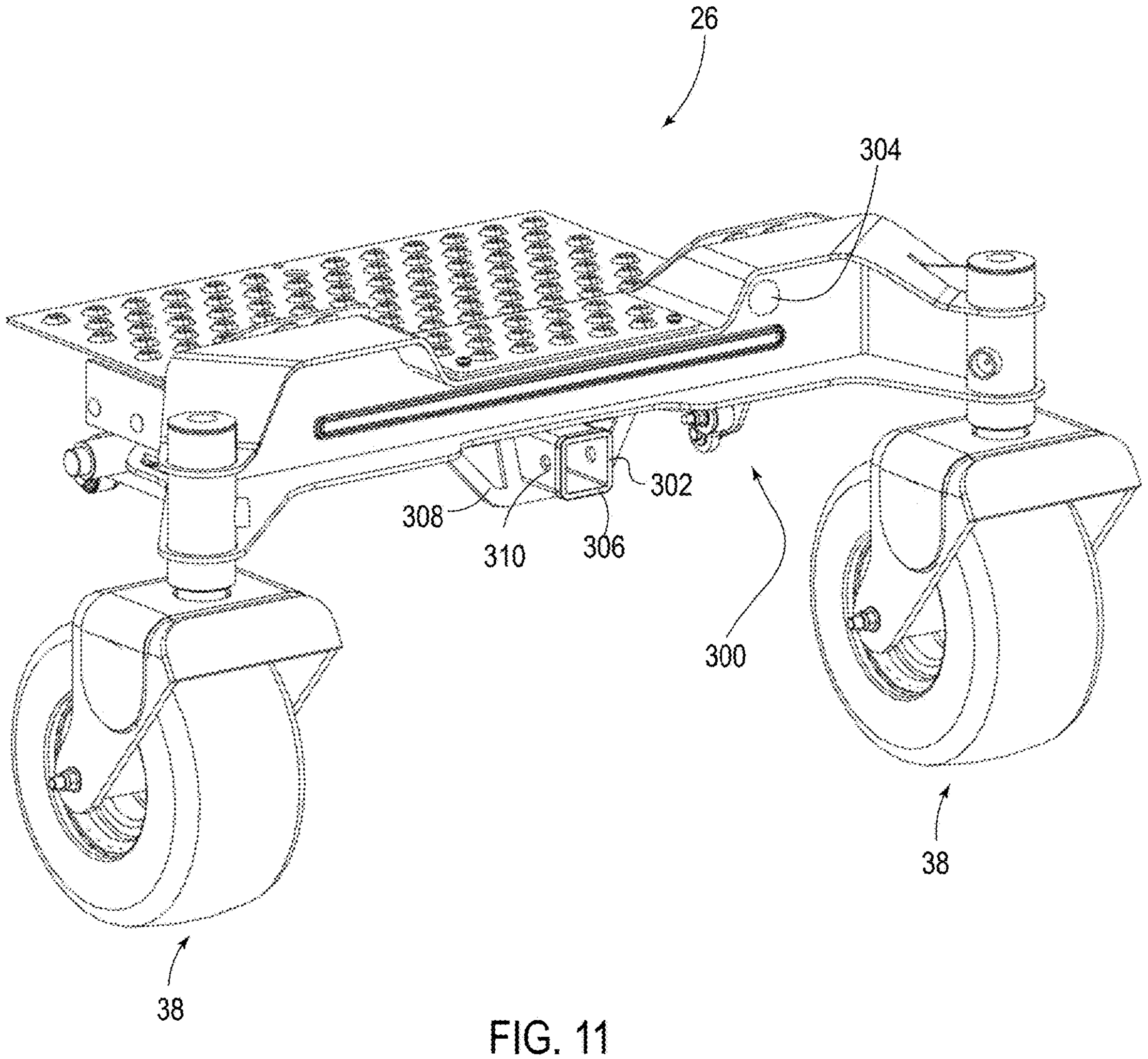
FIG. 11 is a perspective view of a front axle assembly of the outdoor power machine of FIG. 1.
Figure 12:
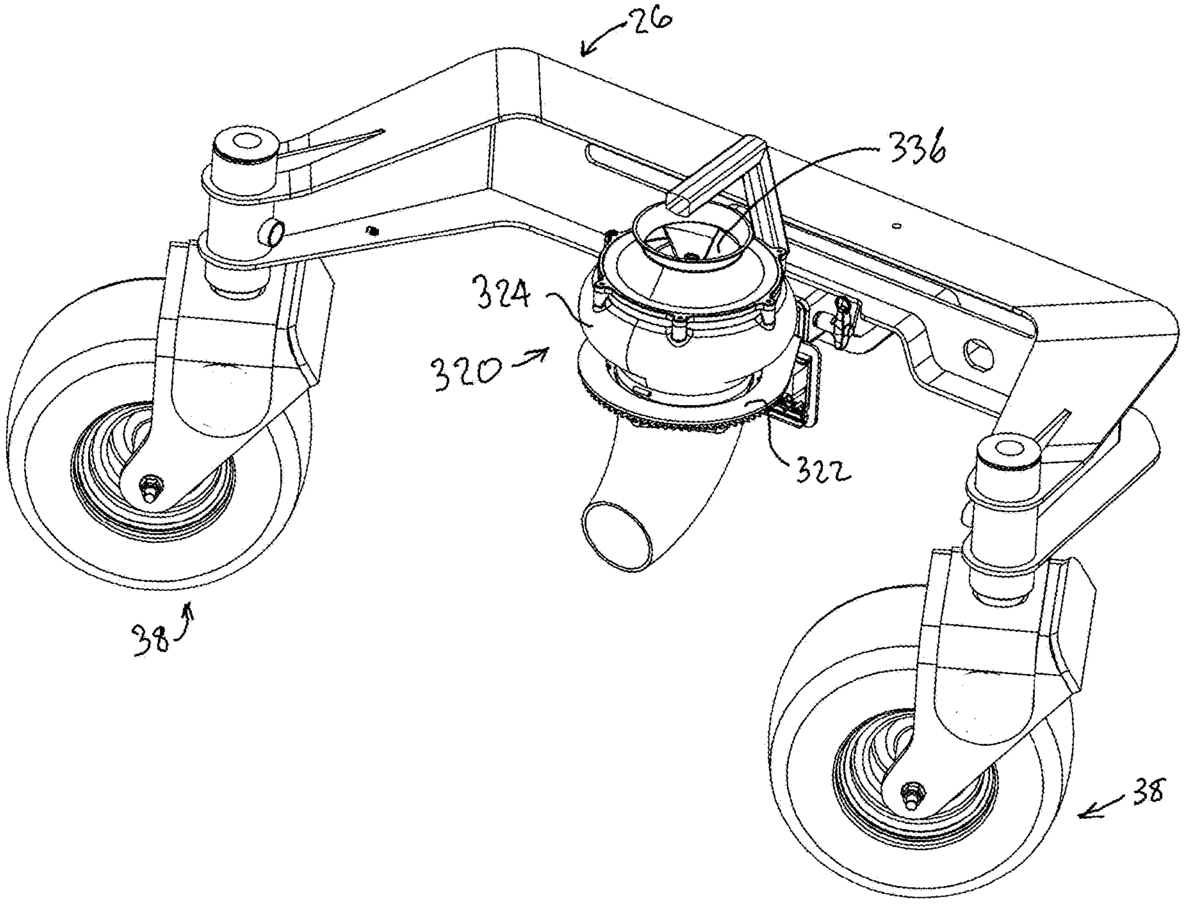
FIG. 12 is a perspective view of a front axle assembly and a representative blower.
Figure 13:
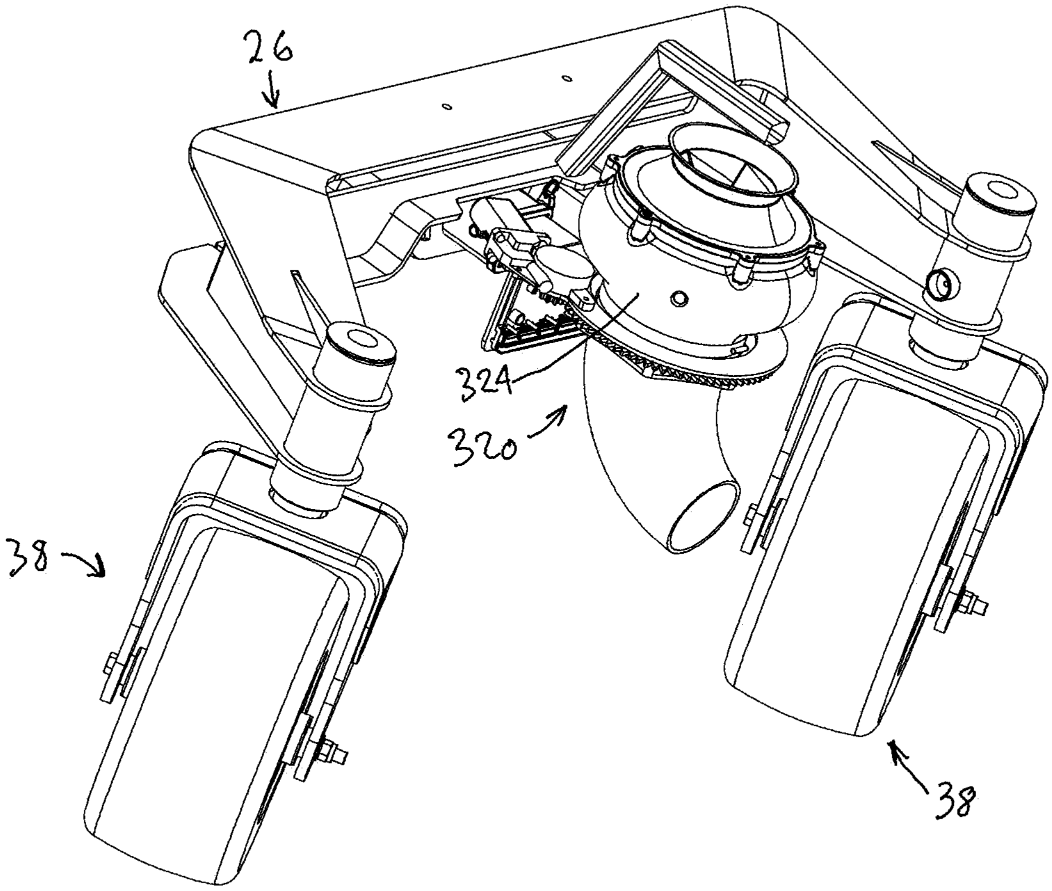
FIG. 13 is another perspective view of the front axle assembly and blower of FIG. 12.

In addition to the mowing deck assembly 200, the outdoor power machine 10 or 100 can be equipped with various functional accessories, some of which may be power-operated. To facilitate this function, the outdoor power machine 10 may incorporate an "electric power takeoff" or "ETO" assembly 300. Referring to FIG. 11, the ETO assembly 300 includes a physical mount 302 and an electric receptacle 304. As will be described in more detail, these two components permit an accessory to be attached to the outdoor power machine 10 and provided with electric power. (FIG. 11 shows the front axle assembly of outdoor power machine 10, but this is representative of the front axle assemblies of both of the machines described herein).

Nonlimiting examples of devices that could be connected to the ETO 300 include leaf blowers, sprayers, dethatchers, aerators, power inverters, articulated dump buckets, or mowers.

The physical mount 302 (alternatively referred to as a receiver) securely attached to the front axle assembly 26. In the illustrated example, the receiver 302 takes the form of a short section of heavy-wall square steel tubing, similar in construction to a conventional hitch receiver. It is aligned axially and has a front opening 306. The receiver 302 is welded, bolted, or otherwise secured to the front axle assembly 26. In the illustrated example, a reinforcement bracket 308 extends between the receiver 302 and the front axle assembly 26.

The receiver 302 is configured such that an accessory can be removably attached thereto. As used herein, the term "removably attached" refers to the ability of an object to be connected or disconnected without tools with a minimal use of tools. In other words, a removable attachment of one object to the other does not require major deconstruction or fabrication for removal. An example of a removable attachment would be a connection utilizing a latch or a securing element such as a quick release pin, a hitch pin, or a bolt.

In the illustrated example, the receiver 302 includes a pair of coaxial holes 310 which are sized and shaped to receive a hitch pin, bolt, or other similar securing element to secure an accessory to the receiver 302.

The electric receptacle 304 has a high voltage (e.g. 82V) electric connection to the electric power pack 28. It also includes appropriate physical and electric connections to permit a power cable (not shown) to be connected thereto. The connection to the electric power pack 28 may be controlled by a switch (not shown) mounted on the outdoor power machine 10. When the switch is "on" (closed), the electric receptacle 304 has battery voltage across its terminals. This connection may be suitable for high-power applications. In one example, it can support a 100 Amp draw at 82 Volts, e.g., an 8200 Watt load. It can thus be used to power an accessory having at least one of an electric motor and an electric actuator.

FIGS. 12-15 illustrate a blower 320 which is one example of an accessory that may use the ETO 300. The blower 320 includes a base plate 322 to which is mounted a fan 324.

The fan 324 has a housing 326 which is generally a body of revolution and extends from an inlet end 330 to an outlet end 332. An air intake 334 is disposed at the inlet end 330 and has a shape which may be straight or may converge in flow area in the direction of flow (labeled "AF"). The air intake 334 may be smoothly curved to guide airflow into the fan 324. The housing 326 encloses an impeller 336 (partially visible in FIG. 12) that is mounted for rotation within the housing 326, for example using bearings or bushings. It rotates about an axis marked "A". Inside the housing 326, the impeller 336 is mechanically coupled to an electric motor (not visible in the drawings). Input of electrical power to the electric motor causes the impeller 336 to rotate, drawing air from the air intake 334 and discharging it through the outlet end 332 of the housing 326. In this example, a discharge elbow 338 is coupled to the outlet end 332 of the housing 326 and turns the air flow existing the fan 324 through approximately 90 degrees, meaning that the discharge elbow 338 orientates the direction of air flow generated by the fan 324 by substantially 90 degrees. The discharge elbow 338 has an upper end in fluid communication with the outlet end 332 of the housing 326 and a lower end, the discharge elbow 338 gradually bends through approximately 90 degrees, meaning that the discharge elbow 338 curving approximately 90 degrees between its upper and lower ends. The discharge elbow 338 may incorporate a flow area reduction, acting as a nozzle to increase flow velocity.

The fan 324 is of a "mixed-flow" type, meaning that the blading of the impeller 336 is configured such that airflow within the fan 324 has both a radial velocity component (perpendicular to axis A) and an axial velocity component (parallel to axis A). The housing 326 has a shape of an oblate spheroid. The diameter of a middle portion of the housing 326 is larger than the diameter of an end opening at the inlet end 330 and the diameter of an end opening at the outlet end 332. The diameter of the end opening at the inlet end 330 is smaller than the diameter of the end opening at the outlet end 332. The diameter of the middle portion of the housing 326 is greater than a distance between the end opening at the inlet end 330 and the end opening at the outlet end 332. In one example, airflow enters the air intake 334 in an axial direction, flows radially outboard as energy is added by the impeller 336, turns radially inward as it diffuses, increasing its pressure, and finally turns in an axial direction prior to exiting the outlet end 332. The fan 324 thus incorporates beneficial aspects of conventional centrifugal-flow blowers while maintaining a compact size and beneficial flow discharge direction of an axial blower.

The base plate 322 is mounted to a receiver mount 340. The receiver mount 340 has a complementary shape to the receiver 302 described above. In the illustrated example, the receiver mount 340 is made from square cross-sectional tubing and includes holes for receiving a hitch pin, bolt, or similar fastener 342.

Figure 14:
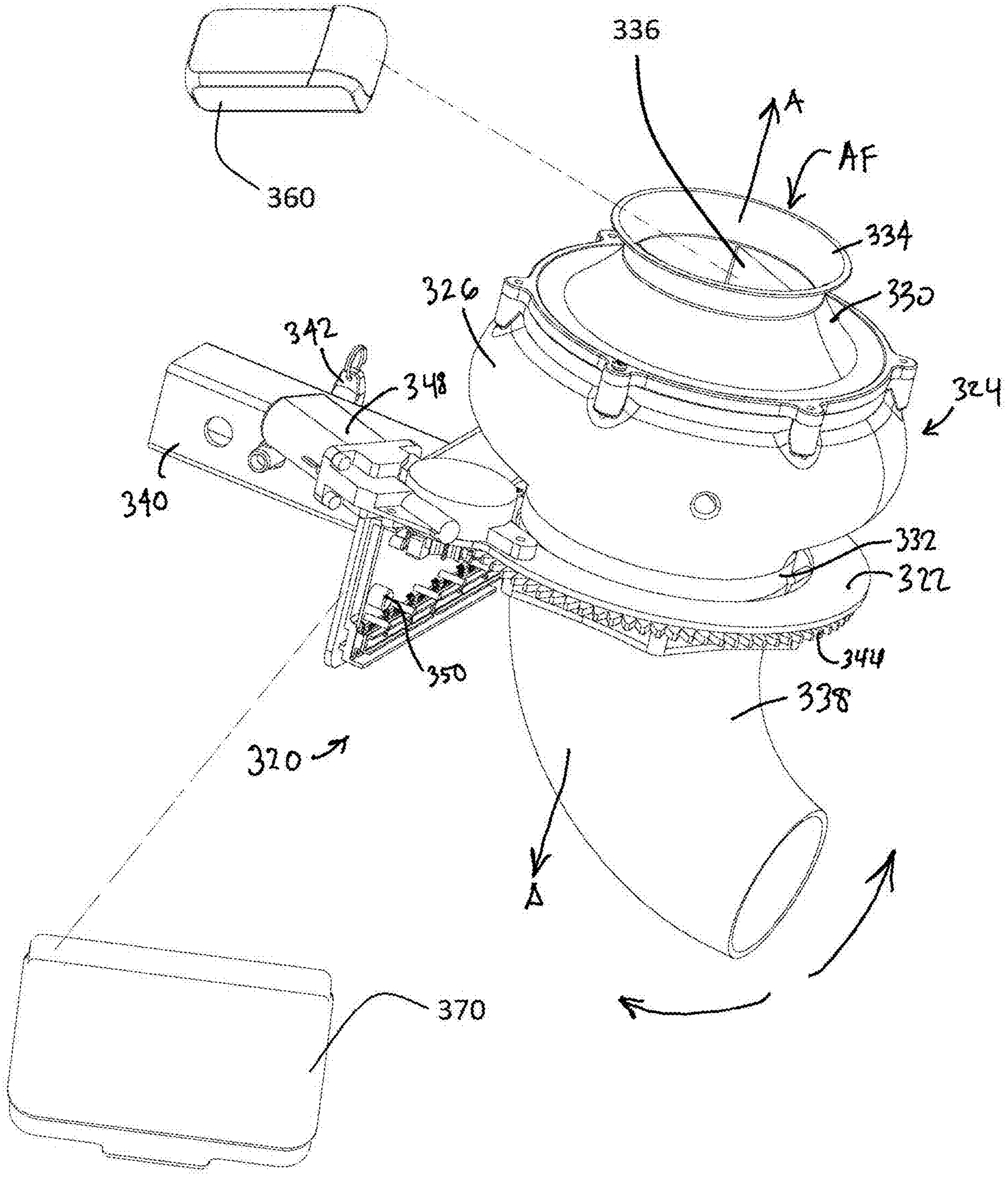
FIG. 14 is a perspective view of the blower of FIG. 12.
Figure 15:
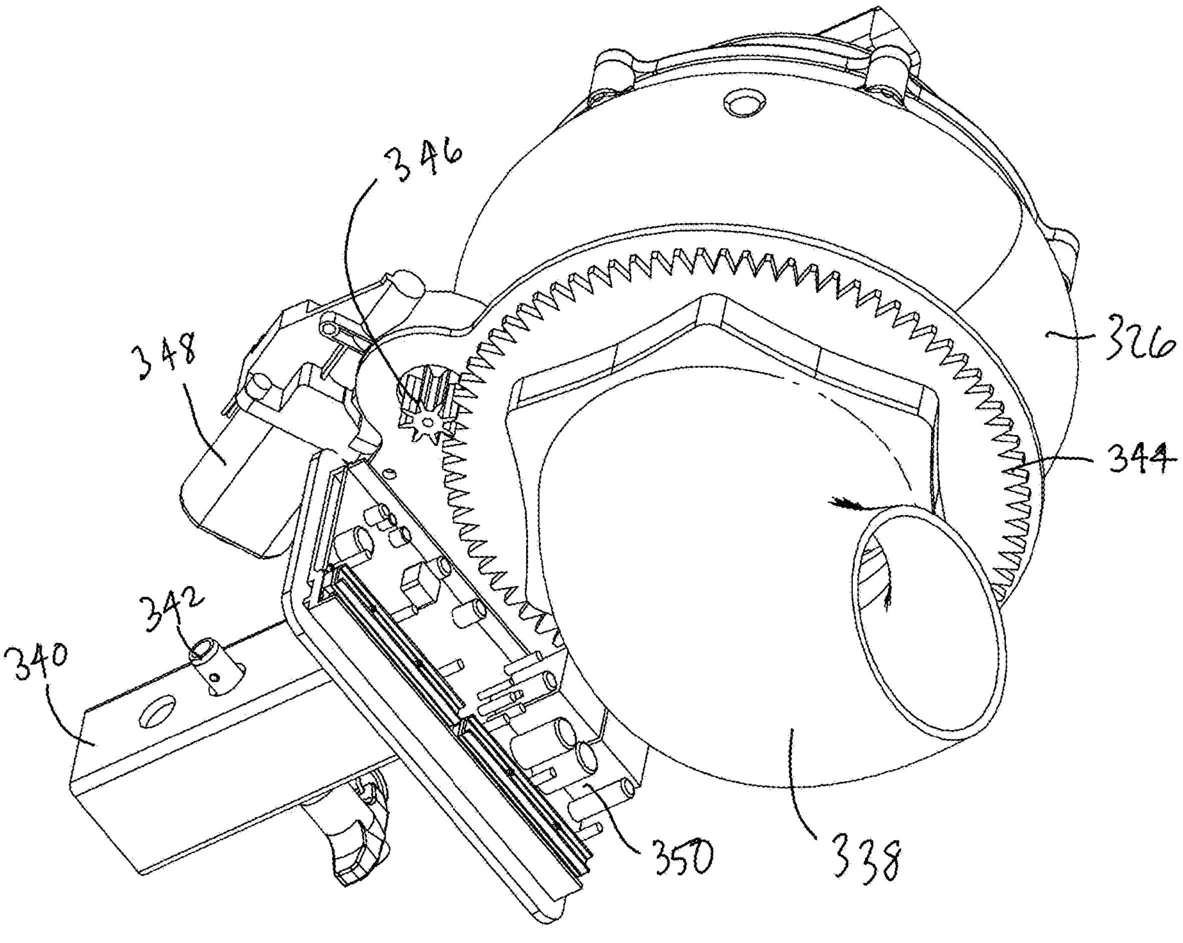
FIG. 15 is a perspective view of an underside of the blower of FIG. 12.

As best seen in FIGS. 14 and 15, the discharge elbow 338 is pivotally mounted so that it can swing left or right relative to the base plate 322 as shown by the arrows. This allows the direction of air flow to be steered during fan operation. The fan 324 may be turned manually. However, in the illustrated example, fan steering is powered. More specifically, a ring gear 344 is mounted to the discharge elbow 338. A pinion gear 346 is meshed with the ring gear 344 and is driven by an electric steering motor 348 mounted to the base plate 322. Motor drive electronics 350 for the fan 324 and/or steering motor 348 may be provided, mounted to the base plate 322.

A fan steering switch (not shown) may be provided and placed with reach of the operator. An on/off switch and/or a speed control switch for the fan 324 may also be provided and placed with reach of the operator. In one example, at least one switch is configured to deliver a signal/signals to the motor drive electronics 350, the at least one switch is mounted to a console/control pedestal of the outdoor power machine 10. Control of the fan 324 (or other implement) may be through a direct wired connection (not shown). Alternatively, control may be through a wireless connection such as Bluetooth or RF wireless. In this configuration, a remote control 370 incorporating a wireless transceiver would be stored or installed near the controls of the outdoor power machine. The suitable receiver for receiving commands would be incorporated into the fan 324 (along with motor drive electronics 350), or other implement. This will provide a means for controlling the fan 324 or other implement when detached from the outdoor power machine.

The fan 324 may be powered using a power cable (not shown) coupled to the electric receptacle 304 (FIG. 11). Alternatively, the fan 324 (or other implement) may be provided with its own rechargeable battery 360. The implement battery may be charged using a connection to the electric receptacle 3041 mounted to the outdoor power machine. The implement battery provides an independent power source for operation of the implement when removed from the outdoor power machine.

In addition to the use for nonpowered or powered accessories, the ETO 300 enables the use of the outdoor power machine 10 as a "Mobile power supply". For example, the electric receptacle 304 may be used to provide DC power directly to an electric device that requires power for operation and/or battery charging. Alternatively, an inverter (not shown) may be coupled to the receiver 302 and electrically connected to the electric receptacle 304. The inverter may then be used to provide DC electric power to devices requiring it.

The machine described herein has advantages over prior art machines. It permits the use of accessories, including powered accessories without the use of mechanical or hydraulic power transfer systems. It can thus provide all of the functions of a conventional outdoor power machine, while being solely electrically powered.

The foregoing has described an outdoor power machine. All of the features disclosed in this specification, and/or all of the steps of any method or process so disclosed, may be combined in any combination, except combinations where at least some of such features and/or steps are mutually exclusive.

Each feature disclosed in this specification may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends, or to any novel one, or any novel combination, of the steps of any method or process so disclosed.

What is claimed is:

1. An outdoor power machine, comprising:

a chassis defining a longitudinal axis;

two front caster wheel assemblies mounted to the chassis, each front caster wheel assembly including a pivot assembly defining a vertical pivot axis;

a base plate connected to a front end of the chassis;

a fan mounted to the base plate, the fan including:

a housing having an inlet end and an outlet end; and an impeller rotatably mounted in the housing, wherein the impeller is configured to guide airflow within the fan having both a radial velocity component and an axial velocity component; and an air intake disposed at the inlet end, wherein the air intake converges the airflow in a direction of flow;

wherein the housing has a shape of an oblate spheroid, a diameter of a middle portion of the housing is larger than a diameter of an end opening at the inlet end and a diameter of an end opening at the outlet end, the diameter of the end opening at the inlet end is smaller than the diameter of the end opening at the outlet end, and the diameter of the middle portion of the housing is greater than a distance between the end opening at the inlet end and the end opening at the outlet end;

wherein the housing defines a vertical central axis disposed longitudinally rearward of the vertical pivot axes of the two front caster wheel assemblies;

wherein a maximum vertical dimension of the housing is less than a vertical distance from a ground surface to an uppermost point of each of the two front caster wheel assemblies;

wherein the chassis includes a forward-facing recess in which the base plate and the fan are disposed, wherein the base plate has an upper part that is aligned substantially perpendicular to the vertical central axis having an annular shape with an opening in which the fan is mounted and a lower part that is aligned substantially parallel to the vertical central axis on which a receiver mount and motor drive electronics are mounted.

2. The outdoor power machine of claim 1 wherein the air intake is curved to guide airflow into the fan.

3. The outdoor power machine of claim 1, further comprising a discharge elbow, wherein the discharge elbow is coupled to the outlet end of the housing.

4. The outdoor power machine of claim 3, wherein the discharge elbow orientates the direction of airflow generated by the fan by substantially 90 degrees.

5. The outdoor power machine of claim 3, wherein the discharge elbow is rotatably disposed relative to the base plate to steer the direction of airflow.

6. The outdoor power machine of claim 5, further comprising a ring gear mounted to the discharge elbow and a pinion gear meshed with the ring gear, wherein the pinion gear is driven by a steering motor mounted to the base plate.

7. The outdoor power machine of claim 6, wherein the motor drive electronics control the fan and steering motor.

8. The outdoor power machine of claim 1, wherein the chassis is provided with a physical mount, the base plate is removably attached to the chassis through the physical mount.

9. The outdoor power machine of claim 8, further comprising a reinforcement bracket extending between the physical mount and the chassis.

10. The outdoor power machine of claim 1, further comprising an electric power pack mounted on the chassis, wherein the outdoor power machine is powered by the electric power pack.

11. The outdoor power machine of claim 10, wherein the fan is powered by the electric power pack.

12. The outdoor power machine of claim 10, further comprising a rechargeable battery for supplying power for the fan.

13. The outdoor power machine of claim 12, wherein the rechargeable battery is charged by the electric power pack.

14. The outdoor power machine of claim 10, wherein the chassis including a pair of spaced-apart main frame rails, a bottom surface of the electric power pack is located below a bottom surface of the main frame rails.

15. The outdoor power machine of claim 7, further comprising at least one switch configured to deliver a signal to the motor drive electronics, wherein the at least one switch is located within reach of an operator.

16. The outdoor power machine of claim 15, wherein the at least one switch communicates with the motor drive electronics through a wired connection.

17. The outdoor power machine of claim 7, further comprising a remote control that communicates wirelessly with the motor drive electronics.

* * * * *